United States Patent
Arora et al.

(10) Patent No.: US 8,732,583 B2
(45) Date of Patent: May 20, 2014

(54) METHOD OF REMOTELY CONTROLLING A PRESENTATION IN LOOP MODE USING A PORTABLE ELECTRONIC DEVICE

(75) Inventors: Rakesh Kumar Arora, Mississauaga (CA); Keith William Paterson, Waterloo (CA); Ming Zhao, Mississauga (CA); Hong Albert Cai Wang, Mississauga (CA); Dan Mihai Dumitru, Wilmington, DE (US)

(73) Assignee: BlackBerry Limited, Waterloo (CA)

( * ) Notice: Subject to any disclaimer, the term of this patent is extended or adjusted under 35 U.S.C. 154(b) by 602 days.

(21) Appl. No.: 12/790,582

(22) Filed: May 28, 2010

(65) Prior Publication Data

US 2011/0167351 A1 Jul. 7, 2011

Related U.S. Application Data

(60) Provisional application No. 61/292,337, filed on Jan. 5, 2010.

(51) Int. Cl.
*G06F 3/00* (2006.01)
*G06F 17/21* (2006.01)

(52) U.S. Cl.
CPC .................................. *G06F 17/211* (2013.01)
USPC ........................... 715/732; 715/738; 715/761

(58) Field of Classification Search
USPC ......................................... 715/732, 738, 761
See application file for complete search history.

(56) References Cited

U.S. PATENT DOCUMENTS

| | | | |
|---|---|---|---|
| 5,859,623 A | 1/1999 | Meyn | |
| 6,008,807 A * | 12/1999 | Bretschneider et al. | 715/732 |
| 6,525,670 B1 * | 2/2003 | Doi et al. | 340/870.16 |
| 7,007,235 B1 * | 2/2006 | Hussein et al. | 715/751 |
| 7,123,212 B2 * | 10/2006 | Acharya et al. | 345/2.1 |
| 7,180,475 B2 * | 2/2007 | Slobodin et al. | 345/2.3 |
| 7,870,496 B1 * | 1/2011 | Sherwani | 715/761 |
| 7,934,834 B2 * | 5/2011 | Slobodin et al. | 353/30 |
| 7,983,662 B1 * | 7/2011 | Ramer et al. | 455/418 |
| 7,996,436 B2 * | 8/2011 | Schneider et al. | 707/802 |
| 8,028,251 B2 * | 9/2011 | Park et al. | 715/863 |
| 8,520,603 B2 * | 8/2013 | Kozisek et al. | 370/328 |
| 8,559,732 B2 * | 10/2013 | Rayner | 382/224 |
| 8,581,931 B2 * | 11/2013 | Arora et al. | 345/629 |
| 8,605,308 B2 * | 12/2013 | Lee et al. | 358/1.15 |
| 2005/0036509 A1 * | 2/2005 | Acharya et al. | 370/466 |

(Continued)

FOREIGN PATENT DOCUMENTS

DE 10242161 A1 3/2004

OTHER PUBLICATIONS

Extended European Search Report; EP 10164300.5; issued Oct. 4, 2010.

*Primary Examiner* — David Phantana Angkool
(74) *Attorney, Agent, or Firm* — Novak Druce Connolly Bove + Quigg LLP (57) ABSTRACT

A system and method are set forth for remotely controlling a presentation in a loop mode to allow the presentation to continue in the absence of a communication channel between the portable electronic device and remote presentation device. In particular, the portable electronic device can issue a command to the remote presentation device to present the presentation in loop mode so that a user of the portable electronic device can leave the vicinity of the remote presentation device (e.g. out of communication range) while the presentation plays in loop mode.

14 Claims, 7 Drawing Sheets

(56) References Cited

U.S. PATENT DOCUMENTS

| | | | |
|---|---|---|---|
| 2005/0101343 A1* | 5/2005 | Hsiao | 455/550.1 |
| 2007/0124372 A1 | 5/2007 | Liu | |
| 2009/0022208 A1* | 1/2009 | Hall et al. | 375/132 |
| 2009/0116431 A1* | 5/2009 | Cadieux | 370/329 |
| 2009/0233643 A1* | 9/2009 | Nishimura | 455/559 |
| 2009/0251607 A1 | 10/2009 | Stoddart | |
| 2010/0169790 A1* | 7/2010 | Vaughan et al. | 715/740 |
| 2011/0164043 A1* | 7/2011 | Arora et al. | 345/473 |
| 2011/0246893 A1* | 10/2011 | Paas et al. | 715/732 |

* cited by examiner

METHOD OF REMOTELY CONTROLLING A PRESENTATION IN LOOP MODE USING A PORTABLE ELECTRONIC DEVICE

CROSS REFERENCE TO RELATED APPLICATIONS

This application claims priority from U.S. provisional patent application No. 61/292,337, filed on Jan. 5, 2010, and which is incorporated by reference in its entirety, for all purposes, herein.

FIELD

The present disclosure relates to portable electronic devices, and more particularly to a method of remotely controlling a presentation in a loop mode using a portable electronic device.

BACKGROUND

Electronic slide presentations are a common way to present information to one or more viewers. Slide presentation software (e.g. PowerPoint®) facilitates the creation of multimedia documents incorporating text, images, audio and/or visual clips for presentation in one or more slides. Often the documents are presented in a slideshow, displaying the slides sequentially. The slides may be displayed to a display screen of a computing device (e.g. personal computer) or remotely via a presentation device such as a projector for projecting the presentation to a remote screen.

More particularly, portable electronic devices such as wireless mobile devices (cellular phones, PDAs (Personal Digital Assistants), etc.) among others, may include a viewer for displaying slide presentations in multiple display modes, such as a text mode for displaying text information distilled from the slides, a preview mode for displaying thumbnail slide images rendered from the slides and a mixed mode for displaying both text information and thumbnail slide images together. The slide presentation viewer may also include a slide show mode to display the slide images in full screen along with an interface (e.g. menu) for selecting among the multiple modes and for invoking and controlling the slide show. For handheld wireless communication devices in particular, a network server may process slide presentation documents to generate the text information and slide images for communicating to wireless devices equipped with appropriate slide presentation viewers. The network server may be an attachment server providing services for email attachments and the slide presentation viewers may be attachment viewers for email or dedicated viewers for presentations.

Handheld communication devices may also be capable of remotely controlling display of an electronic slide presentation. For example, a presentation mode of operation may be provided for wirelessly controlling display of a slide presentation on a remote presentation device. When controlling a presentation in this fashion, the slides being displayed on the handheld electronic device are the same as those displayed on the presentation device.

Therefore, a communication channel must be maintained between the handheld device and remote presentation device in order for the presentation to continue. If the handheld device moves out of range of the remote presentation device, or otherwise loses its ability to communicate with the remote presentation device, the communication channel is lost and the presentation will stop.

BRIEF DESCRIPTION OF THE DRAWINGS

The embodiments will be better understood with reference to the following Figures in which like numerals denote like parts and in which.

DETAILED DESCRIPTION

As set forth in greater detail below, a system and method are set forth for remotely controlling a presentation in a loop mode to allow the presentation to continue in the absence of a communication channel between the portable electronic device and remote presentation device. In particular, the portable electronic device can issue a command to the remote presentation device to present the presentation in loop mode so that a user of the portable electronic device can leave the vicinity of the remote presentation device (e.g. out of communication range) while the presentation plays in loop mode.

In one aspect there is provided a method of remotely controlling a presentation device from a portable electronic device, the method comprising: establishing communication between the portable electronic device and presentation device; sending presentation data from the portable electronic device to the presentation device so that a presentation is displayed simultaneously at the portable electronic device and presentation device; and remotely controlling the display of said presentation data at the presentation device to continue in a loop mode in the absence of communication between the presentation device and portable electronic device.

In another aspect there is provided a presentation system, comprising: a portable electronic device capable of displaying a presentation; a presentation device; a communications component in each of said portable electronic device and presentation device for establishing communication therebetween; a presentation application component associated with the portable electronic device in communication with a presentation adapter associated with the presentation device via each said communications component for sending presentation data from the portable electronic device to the presentation device so that said presentation is displayed simultaneously at the portable electronic device and presentation device and for remotely controlling the display of said presentation data at the presentation device to continue in a loop mode in the absence of communication between the presentation device and portable electronic device.

The term "slide" as used throughout the specification and drawings includes, but is not limited to, a single presentation slide (such as a PowerPoint® slide), a page in a PDF document, or a single photo image.

Figure 1:
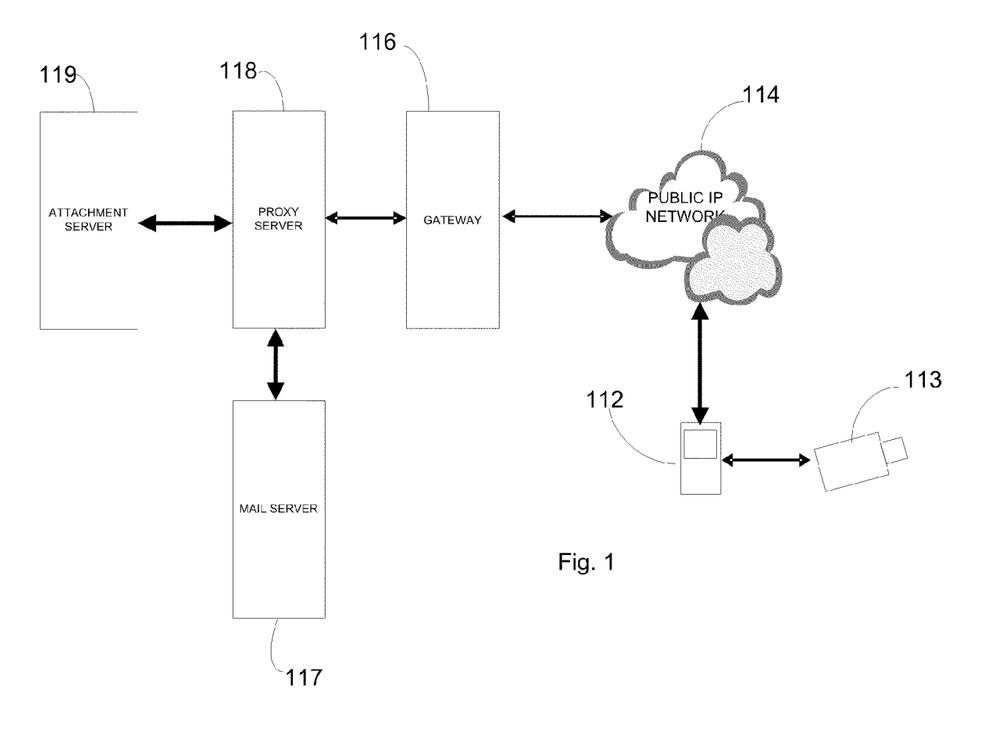
FIG. 1 is a schematic diagram of a wireless communication system.

FIG. 1 shows a communication network system 100 comprising at least one portable electronic device 112, a public IP network 114 (including a wireless carrier network and base station (not shown)), a wireless network gateway server 116, an enterprise email server 117, an enterprise wireless communication device server or proxy server 118 and an attachment server 119.

The portable electronic device 112 is operable to effect communications over public IP network 114 via a radio communications channel, and communicates with the base station (not shown) while located within a coverage area that is defined by the base station. The base station is part of the wireless public IP network 114, or other network such as a WAN (Wide Area Network). Data is delivered to the portable electronic device 112 via wireless transmission from the base station. Similarly, data is sent from the portable electronic device 112 via wireless transmission to the base station.

It will be appreciated that the portable electronic device 112 is movable within the coverage area and can be moved to coverage areas defined by other base stations. Further, as will be understood by one of ordinary skill in the art, wireless networks include GSM/GPRS, CDPD, TDMA, iDEN, Mobitex, DataTAC networks, EDGE, EVDO or UMTS and broadband networks such as Bluetooth and variants of 802.11.

The portable electronic device 112 is further operable to deliver content to and control a presentation device 113. For example, device 112 can send slide presentation content and control signals to the presentation device 113 for controlling display of a presentation, such as a PowerPoint® presentation or successive pages of an image attachment, such as a PDF document.

Proxy server 118 handles client requests from the portable electronic device 112 for documents stored within attachment server 119. The attachment server 119 communicates with the proxy server 118 to transmit attachments such as documents, spreadsheets, images, multimedia files, etc. through the gateway 116 and network 114 for viewing via an attachment viewer of the portable electronic device 112 so as to allow a user to view attachments that are received in email messages. While only one attachment server 119 is shown for illustration purposes, a person skilled in the art will understand that the attachment server 119 may alternatively be a network of attachment servers. Sources for the attachments stored within server 119 include mail server 117, and may include a web server, IM server, etc. Preferably the attachment data is downloaded to portable electronic device 112 in chunks of binary data in an attachment viewer readable format, for example Universal Content Stream (UCS) format.

Figure 2:
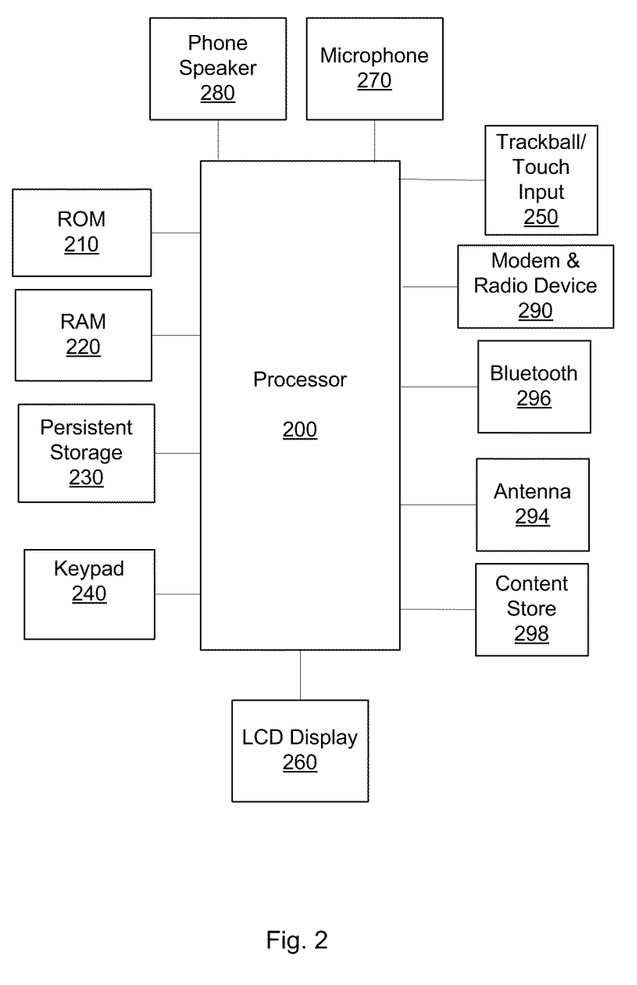
FIG. 2 is a block diagram of components of a portable electronic device forming part of the communication system of FIG. 1, according to an embodiment.

Referring now to FIG. 2, a block diagram of certain components within the portable electronic device 112 is provided. In the present embodiment, the portable electronic device 112 is based on the computing environment and functionality of a wireless personal digital assistant (PDA). It will be understood, however, that the portable electronic device 112 is not limited to wireless personal digital assistants. Other portable electronic devices are possible, such as smart telephones, and laptop computers.

The portable electronic device 112 includes a processor 200 connected to a read-only-memory (ROM) 210 that contains a plurality of applications executable by the processor 200 for enabling the portable electronic device 112 to perform certain functions including, for example, PIN message functions, SMS message functions and cellular telephone functions, and at least one attachment viewer application for viewing attachments (e.g. document attachments to emails or documents from other sources, such as web servers, etc.). The processor 200 is also connected to a random access memory unit (RAM) 220 and a persistent storage device 230, which are responsible for various storage functions of the portable electronic device 112. The processor 200 receives input from input devices such as a keypad 240 and a trackball or touch sensitive input 250. The processor 200 outputs to various output devices, such as an LCD display 260. A microphone 270 and phone speaker 280 are connected to the processor 200 for cellular telephone functions. The processor 200 is also connected to a modem and radio device 290. The modem and radio device 290 is used to connect to wireless networks for transmitting and receiving voice and data communications through an antenna 294. A Bluetooth receiver/transmitter 296 may be provided to effect wireless (i.e. infrared) communication between device 112 and other Bluetooth-enabled devices, such as presentation device 113, as discussed in greater detail below. A content store 298, which is generally a file storage system for the portable electronic device 112, is also provided.

Request/view functionality for an attachment is provided by the client/server combination of attachment viewer within the portable electronic device 112 and the attachment server 118. More particularly, with reference to FIG. 3, portable electronic device 112 is configured (e.g. via software stored, for example, in ROM 210) to comprise various components including an operating system 300, a communications system 305 for wireless communication, an email application 310 and other applications 315. Email application 310 may comprise or otherwise cooperate with various attachment viewers 320 for retrieving and viewing attachments. One such attachment viewer is slide presentation viewer 325. Other viewers 330 may include spreadsheet viewers, image viewers, word processing document viewers, etc. (not described herein). Other applications 315 may include other communication and control applications 317 and a presentation application 319 for communicating with and controlling presentation device 113.

Figure 3:
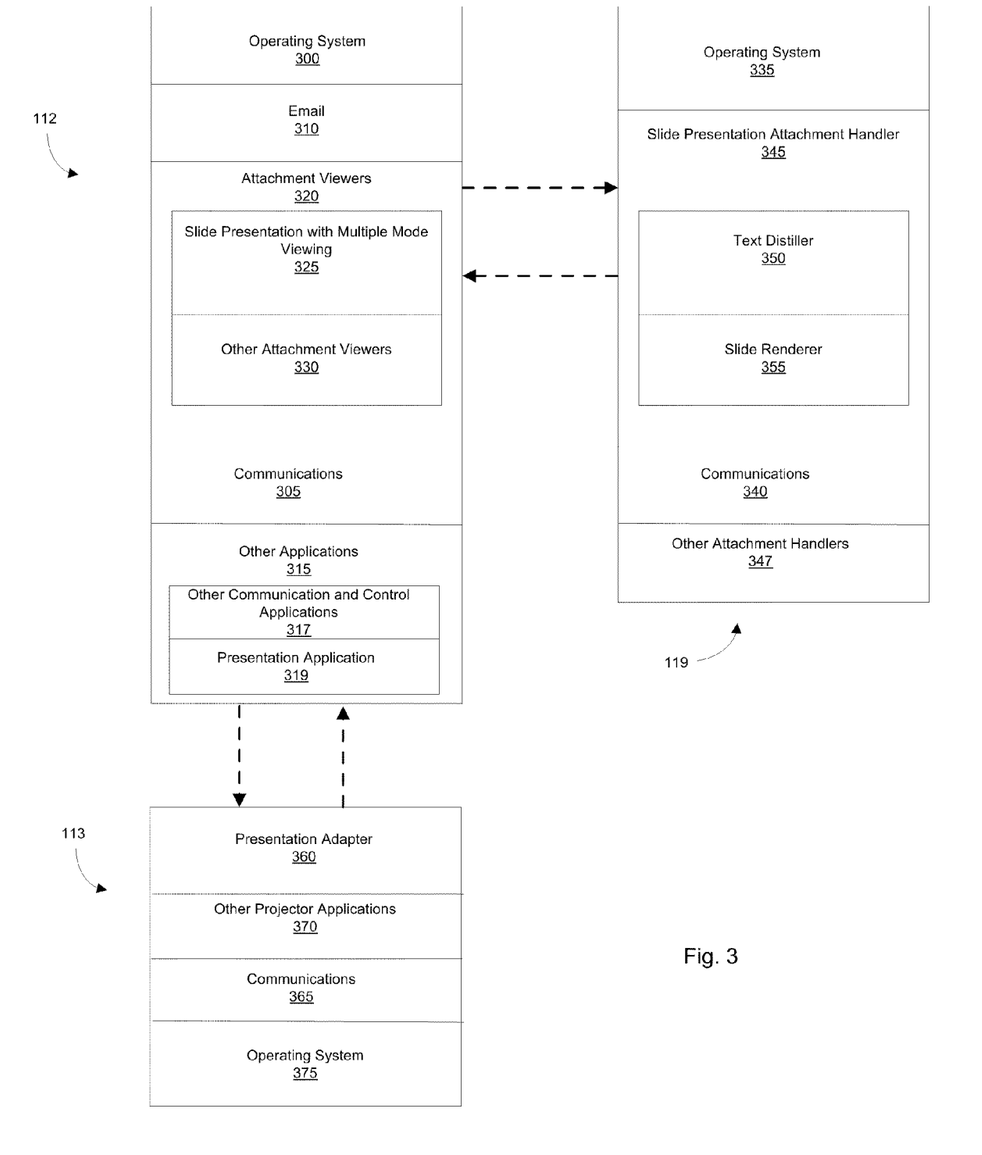
FIG. 3 is a block diagram showing client-server functional components for downloading and viewing a presentation on the portable electronic device, according to an embodiment.

Attachment server 119 is configured (e.g. via software stored, for example, in non-volatile memory (not shown)) to comprise various components including a operating system 335, communications system 340, slide presentation attachment handler 345 as well as other attachment handlers 347 for other attachment types. Slide presentation attachment handler 345 comprises or otherwise cooperates with a text distiller 350 and slide renderer 355. Text distiller 350 is configured to parse or otherwise review slide presentation documents to extract text information for delivery to handheld devices such as portable electronic device 112. Slide renderer 355 defines rasterized slide images (e.g. in a jpeg, tiff or other image format) from the slide presentation document for each slide for similar delivery.

The attachment server 119 and/or proxy server 118 and portable electronic device 112 communicate such that when a user invokes the attachment viewer 325 to view the content of a slide presentation, the portable electronic device 112 transmits one or more requests for slide information, (i.e. the text information and slide images) and receives the same in response. Requests and responses are illustrated notionally as communicating directly between the portable electronic device 112 and attachment server 119 but it is understood that communications are through network 114 via gateway 116 and proxy server 118.

Due in part at least to communication protocol constraints on a message's size, a single message may be insufficient to communicate all of the text information and/or all of the slide images for a slide presentation document. Thus, the portable electronic device 112 may make multiple requests either automatically or in response to direct or indirect user actions. For example, as described above, during a slide show, the slide presentation viewer 325 may automatically make requests for slide information in the background while a slide show is being viewed. For example, the viewer 325 may anticipate the need for more slide information in response to input via trackball or touch input 250 including but not limited to scrolling toward the end of the slides present on the handheld device. Alternatively, a menu choice may be invoked (e.g. a "More" command) for additional slide information, as applicable, to pre-load slides.

Preferably, a request (e.g. for slide information) includes a flag or other data indicating a screen size for the portable electronic device 112 when rendering slide images. This may be a specific pixel size (e.g. 340×280), a code flag (1=340× 280 pixels) or a device type, among other types, where the attachment server 119 or proxy server 118 determines the screen size from the code flag or device type. Other display capabilities may be indicated to the attachment server 119 as well or alternatively. For example, the colour capabilities of the display screen (e.g. back and white only or the number of colours available), reflective type, etc. may be indicated to help render slide images. The attachment server 119 may then adjust the colour palette of the rendered slide presentation for viewing on the requesting device.

Slide presentation viewer 325 provides a graphical user interface (GUI), described in greater detail below, to present the slides in the various modes and provides a menu or other command interface for user input to invoke the presentation application 319 for transmitting the slide presentation to presentation device 113 and controlling the presentation thereat.

More particularly, presentation device 113 includes a presentation adapter 360 for communicating with presentation application 319 so that the presentation may continue in a loop mode without maintaining communication between the presentation device and portable electronic device 112.

In addition to presentation adapter 360, presentation device 113 includes other hardware and software such as communications 365, other projector applications 370 and operating system 375.

Figure 4:
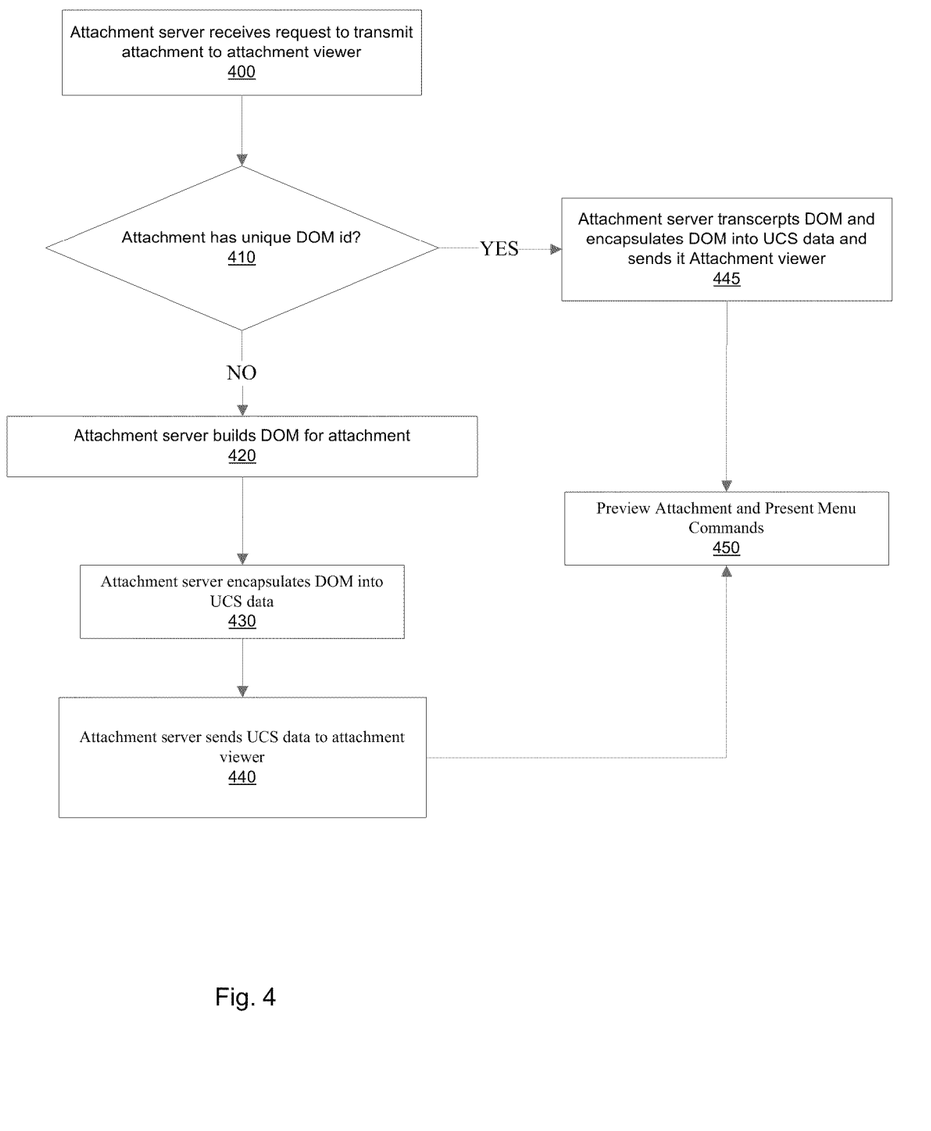
FIG. 4 is a flowchart showing a method for downloading a presentation to the portable electronic device, using the functional components of FIG. 3, according to an embodiment.

With reference to FIG. 4, a method is set forth for downloading and viewing a presentation on the portable electronic device, using the functional components of FIG. 3. First, at 400, the portable electronic device 112 requests an attachment (e.g. slide presentation) from attachment server 119. The request may be initiated, for example, by a trackball click or menu item selection to "Open attachment" or "Download attachment". The presentation attachment may be an attachment to an email, calendar event, instant message (IM), browser link, or other attachment-enabled event.

Figure 5:
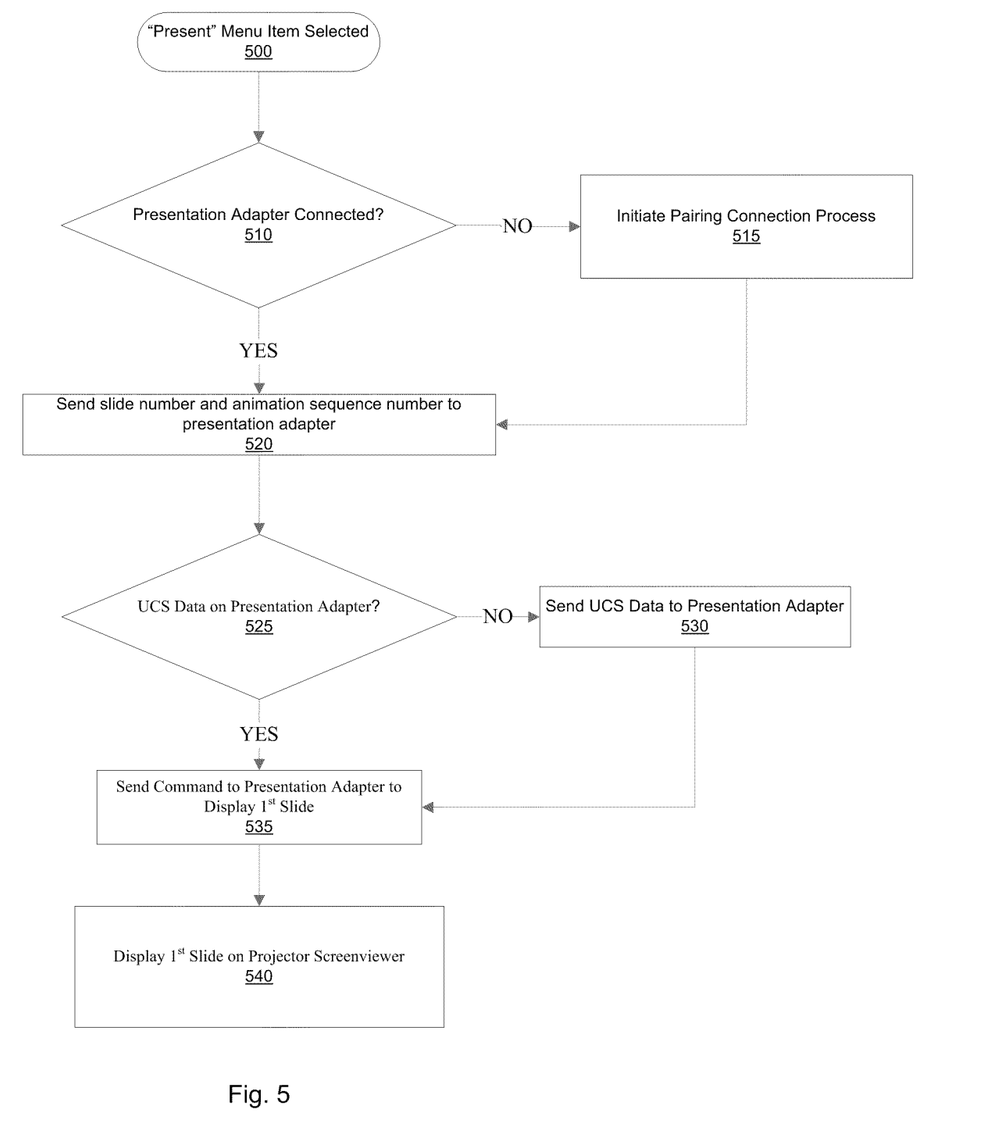
FIG. 5 is a flowchart showing a method of initiating viewing and remote control of a presentation, using the functional components of FIGS. 1-3, according to an embodiment.

Alternatively, if the presentation attachment has been previously saved to memory of the device 119 (e.g. persistent store 230 or SD card (not shown)), then the attachment is locally retrieved and process flows continues at FIG. 5.

If the presentation attachment has not been previously requested (i.e. a "No"at 410), attachment server 119 builds a DOM (Document Object Model) that represents the attachment by parsing the attachment document (step 420). In this manner, a graph structure is built within attachment server 119 representing a map of the original attachment file. The DOM contains textual content, font, style and formatting attributes as well as layout attributes, such as page/slide size, positioning information (i.e. x, y and z coordinates on the page), embedded graphics and tables, for example. DOM structure is known and is disclosed in United States Patent Application No. 2006/0055693, which is herein incorporated by reference.

Once the DOM of the attachment has been built the attachment server 119 transcripts and encapsulates the DOM in UCS data, as indicated at 430. The UCS data is then sent to portable electronic device 112 in chunks, as indicated at 440. Each chunk is a self-contained data representation of a portion of the presentation attachment (e.g. one slide of a presentation). That is, there is sufficient data contained in a chunk to enable the attachment viewer to display the content of the chunk. Depending on the size of the chunks and the size of the attachment, the entire attachment can be transmitted in one chunk or in multiple chunks. Depending on the nature of the request from the attachment viewer, attachment server 119 can transmit the chunks in sequence or out of sequence. For example, if the attachment viewer requests the fifth slide of a presentation attachment, attachment server 119 can transmit the chunks corresponding to the fifth slide, even if chunks for slides 1 to 4 have not been transmitted to the device 112.

The attachment is then previewed via display 260 and several menu or command options are made available (450) such as "Present", "Retrieve Info/View Info", "Zoom", "Rotate", "Fit to Screen", "Next Slide", "Prev Slide (if applicable), "Save Slide", "Download Attachment", "Help", "Call Voice Mail", etc. Additional operations may be performed in response to actuation of the trackball/touch input device 250, such as scrolling to a next (or previous) slide.

If the attachment has been previously requested (i.e. a "Yes" at 410), attachment server 119 transcripts and encapsulates the DOM in UCS data, and transmits the UCS data to portable electronic device 112 in chunks, as indicated at 445, for display (450).

Upon selection of the "Present" command (500), the presentation application 319 is launched, as shown in FIG. 5. At 510, the application first checks to see that the presentation adapter 360 is connected. If not, a communication channel is established between portable electronic device 112 and presentation device 113 via a pairing connection process (515). The pairing connection process calls up a wizard for presenting steps to establish communication pairing between the device 112 and presentation adapter 360 of the presentation device 113 using the communications applications 305 and 365 (e.g. Bluetooth discovery and pairing).

At 520, the application 319 sends at least one of a slide number and animation sequence number to the paired presentation adapter 360. The application then checks for slide presentation data (e.g. a first UCS chunk representing the first slide) having already been transmitted to and locally stored at the presentation adapter 360 (525). If not, the presentation application 319 sends the slide data to the presentation adapter 360 (and simultaneously requests additional data from the attachment server 119, as discussed above in connection with FIG. 4).

At 540, presentation application 319 sends a command to the presentation adapter 360 to display the first slide, while the first slide is simultaneously displayed on the portable electronic device 112 (e.g. functionally equivalent to hitting "F5" on a PC to display a PowerPoint® presentation).

Figure 6:
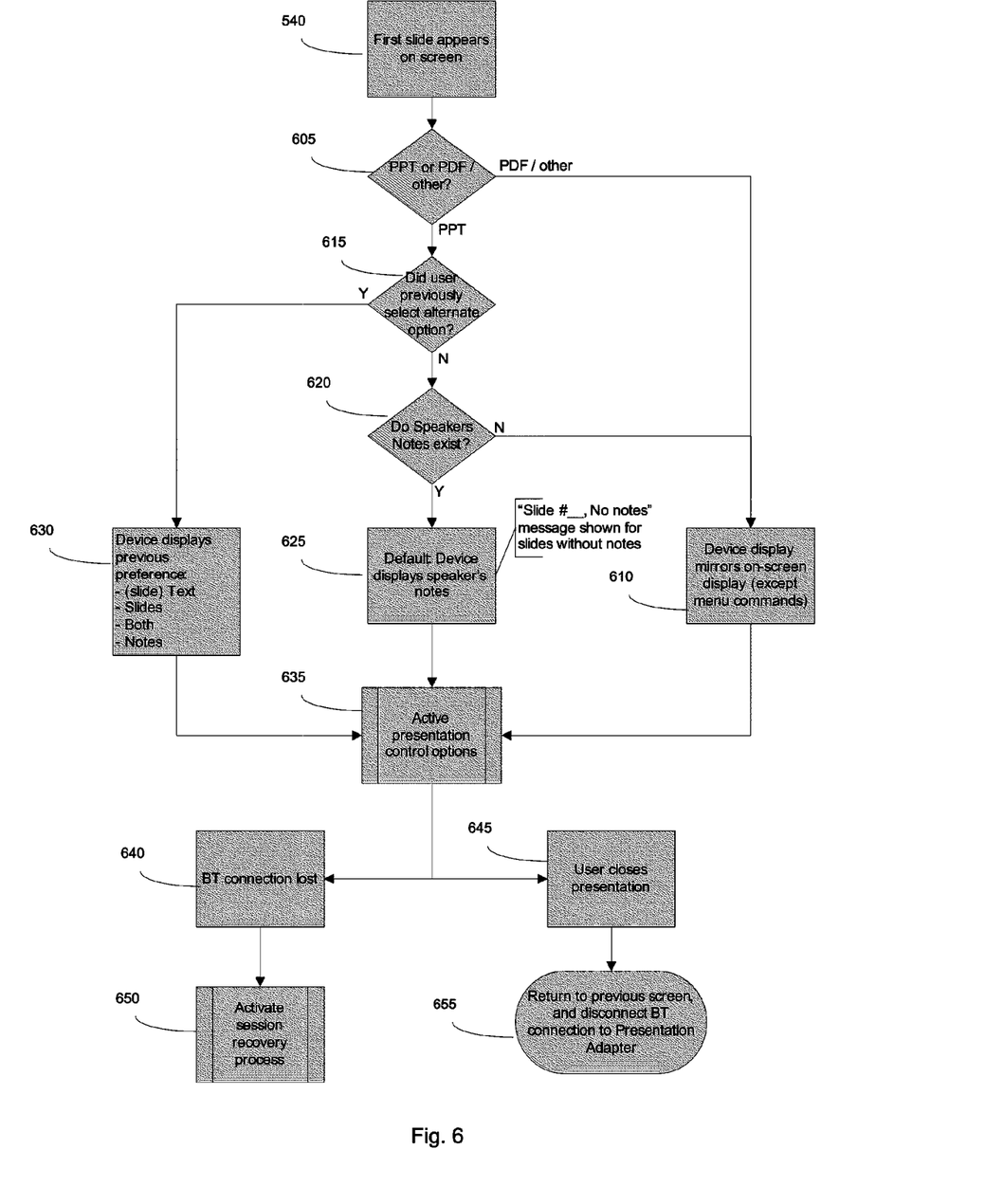
FIG. 6 is a flowchart showing a method of remotely controlling a presentation using the portable electronic device of FIGS. 1-3, according to an embodiment.

Turning to FIG. 6, the presentation typically starts from the first slide regardless of which slide was in preview at 450. Alternatively, an option may be provided for starting the presentation from the slide being previewing at 450.

When UCS slide data is being transmitted to the presentation adapter 360 (e.g. at 530), the portable electronic device 112 must determine what to show on the display 260 (605). When displaying a PDF image or other non-presentation file format, the display 260 mirrors what is being displayed by the presentation device 113 through the presentation adapter 360 (610). When displaying a presentation (e.g. a .PPT file), and if no alternate presentation option was selected (615) then if text is associated with a slide (620), the device 112 can display such text (e.g. speakers notes) while the slide is being displayed via presentation device 113 (625). On the other hand, if no such text exists then the portable electronic device 112 can display a simple message, such as "Slide #__________, No notes" for any slides that are not associated with content in the notes and the slides on the display 260 mirror what is being displayed via presentation device 113.

Additional display options may be provided (630), such as "Text", which shows the slide text with images stripped out, "Slides", which shows the slide images, and "Both", which shows a thumbnail image of the complete slide above stripped out text.

If there are no slides with speakers notes in the entire presentation, the presentation format can default to mirror the content of display 260 with the external presentation device display, unless the user has previously chosen an alternate handheld display option (615).

Menu options may be provided to switch the content on the display 260. If such an alternate option is chosen, the new option will be selected as a new default the next time the presentation adapter 360 is launched.

As shown at 635, various presentation control options may be provided, as set forth in Table A. The control options include several basic control options, which may be implemented differently depending on whether they are actuated from a menu button on device 112, trackball/touch input 250, or a keyboard short-cut on keypad 240. Preferably, a tool tip is displayed via display 260 during navigation between slides, showing at least the slide number, and title of the slide.

If the Bluetooth connection is lost during the presentation (640), the portable electronic device 112 preferably vibrates and displays a "connection lost" message or provides some other indication of the lost connection and an "Active Session Recovery" process (650) is invoked to try and recover the connection using a previously established session ID (520). According to one embodiment, the portable electronic device 112 continues to attempt re-establishment of the lost connection for a default timeout period (e.g. 120 minutes).

If the option to end the presentation is deliberately selected (645), the presentation adapter 360 closes, thereby returning the presentation device display to its state previous to opening the presentation (655) and the wireless pairing between device 112 and presentation device 113 is broken.

Figure 7:
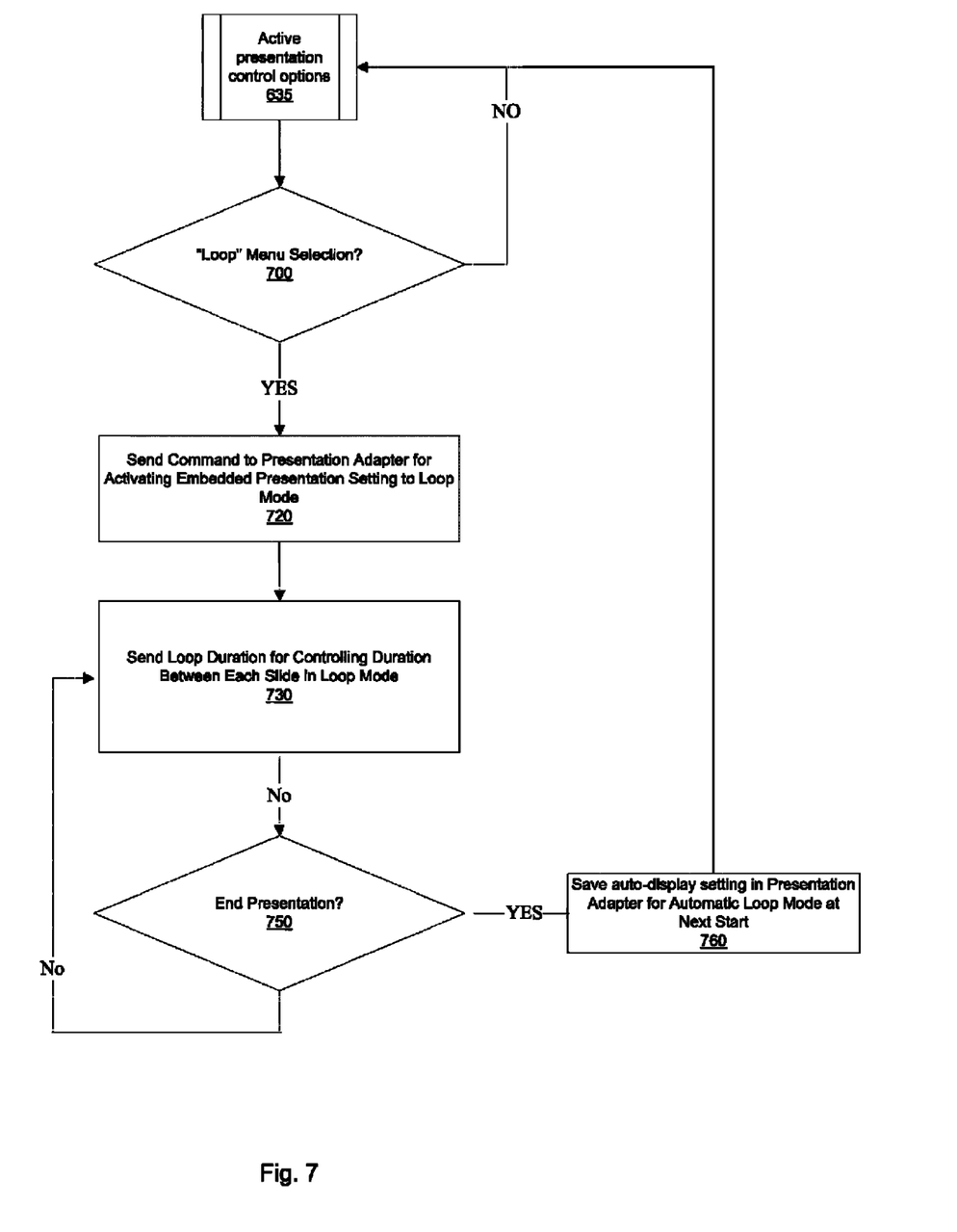
FIG. 7 is a flowchart showing a method of remotely controlling the presentation in a loop mode, according to an embodiment.

Turning now to FIG. 7, a method is shown for remotely controlling the presentation in a loop mode, according to an embodiment. At 700, a menu item is selected at portable electronic device 112 to "Loop" the presentation (e.g. via manipulation and/or actuation of one or more of trackball/touch input 250, keypad 240, etc.) A command is then sent from the portable electronic device 112 to the presentation device 113 (720) via communication between presentation application 319 and presentation adapter 319, to invoke a setting internal to the presentation device 113 (e.g. via other projector applications 370) for causing the presentation to continue in Loop Mode (i.e. automatically circulate back to the first slide following display of the last presentation slide). According to an exemplary embodiment, the command enables a "Loop continuously until 'Esc'" show option in a PowerPoint® presentation. The presentation application 319 also sends a loop duration message to the presentation adapter for controlling the duration (e.g. in seconds) between presentation of successive slides in loop mode (730). Upon deliberately ending the presentation (750) presentation application

TABLE A

| Function | Menu Option | Trackball | Keyboard |
|---|---|---|---|
| Advance to next slide (Single slide advance.) | "Next" | Roll trackball down Or click for menu option "Next" | Spacebar "N" on full QWERTY "6" on Suretype On screen control for touch-screen devices |
| Move back to previous slide (Move back one slide/ animation step. | "Previous" | Roll trackball up Or click for menu option | "P" on full QWERTY "4" on Suretype On screen control for touch-screen devices |
| Go to slide | "Go to Slide . . . " (Brings up input box). | "Go to Slide . . . " (Brings up input box). | (when input box is brought up, keypad defaults to numeric) |
| Freeze frame | "Freeze"/ "Unfreeze" OR "Go to Slide . . . " | | |
| Loop | "Loop" | N/A | N/A |
| End Show | "End Show" Msg box should pop-up asking user "Are you sure you want to exit" | | |

Before describing the various presentation control options of Table A, three methods are briefly described for ceasing control of a presentation: (i) Losing the Bluetooth (BT) connection (640), for example as a result of moving out of range of the presentation adapter 360), and deliberate closing of the presentation (645) by (ii) ending the session at the presentation adapter 360, or (iii) closing the presentation via the presentation application (319).

319 causes a prompt to be generated (760) at display 260 to automatically enter Loop Mode the next time that the presentation device 113 is turned on (i.e. without requiring communication pairing with the portable electronic device 112).

A specific embodiment has been shown and described herein. However, modifications and variations may occur to those skilled in the art. For example, one or more of the functional components of the presentation device 113, such as presentation adapter 360, may be incorporated into the device 113 or may be implemented in a separate interface or control device that is connect to the presentation device 113. All such modifications and variations are believed to be within the sphere and scope of the present embodiment.

What is claimed is:

1. A method of remotely controlling a presentation device from a portable electronic device, the method comprising:
   initiating communication between the portable electronic device and presentation device;
   sending presentation data from the portable electronic device to the presentation device so that a presentation is displayed simultaneously at the portable electronic device and presentation device; and,
   remotely controlling the display of said presentation data at the presentation device to continue in a loop mode by sending a command from the portable electronic device to the presentation device for activating an embedded presentation setting to a loop mode, such that a first slide is displayed after a last slide of the slide of presentation, in the absence of communication between the presentation device and portable electronic device.

2. The method of claim 1, wherein initiating said communication includes wireless pairing of the portable electronic device and presentation device.

3. The method of claim 2, wherein said wireless pairing utilizes Bluetooth communication.

4. The method of claim 1, further including activating a session recovery process for re-initiating communication between the presentation device and portable electronic device.

5. The method of claim 1, further including sending a loop duration message from said portable electronic device to said presentation device for controlling duration between presentation of successive slides of said presentation data in said loop mode.

6. The method of claim 1, wherein sending said command is initiated at the portable electronic device by a menu selection.

7. The method of claim 1, further including displaying a prompt for automating initiation of said loop mode upon subsequently activating said presentation device.

8. The method of claim 4, wherein said sending presentation data and commands from the portable electronic device to the presentation device includes sending a session ID, and said session recovery process attempts to re-initiate communication using said session ID.

9. The method of claim 8, further including checking for slide presentation data having already been transmitted to and locally stored at the presentation device based on at least one of a slide number and an animation sequence number and if slide presentation data has already been locally stored at the presentation device then retrieving and displaying said slide presentation data at said presentation device, and if slide presentation data has not already been transmitted and locally stored at the presentation device then sending the slide data to the presentation adapter for display.

10. A presentation system, comprising:
    a portable electronic device capable of displaying a presentation;
    a presentation device;
    a communications component in each of said portable electronic device and presentation device for initiating communication therebetween;
    a presentation application component associated with the portable electronic device in communication with a presentation adapter associated with the presentation device via each said communications component for sending presentation data from the portable electronic device to the presentation device so that said presentation is displayed simultaneously at the portable electronic device and presentation device and for remotely controlling the display of said presentation data at the presentation device to continue in a loop mode by sending a command from the portable electronic device to the presentation device for activating an embedded presentation setting to a loop mode, such that a first slide is displayed after a last slide of the slide of presentation, in the absence of communication between the presentation device and portable electronic device.

11. The presentation system of claim 10, wherein each said communication component initiates communication via wireless pairing.

12. The presentation system of claim 11, wherein said wireless pairing utilizes Bluetooth communication.

13. The presentation system of claim 12, wherein said presentation device is a projector.

14. The presentation system of claim 10, further including an attachment server for storing said presentation data and having a text distiller for parsing, extracting and transmitting text information from said presentation data to said portable electronic device for transmission to said presentation device, and a slide renderer for rasterizing and transmitting slide images from said presentation data to said portable electronic device transmission to said presentation device.

* * * * *